United States Patent
Wang et al.

(10) Patent No.: US 12,384,035 B1
(45) Date of Patent: Aug. 12, 2025

(54) AUTOMATED TESTING OF VIRTUAL REALITY SOFTWARE APPLICATIONS USING ROBOTIC DEVICES

(71) Applicant: FMR LLC, Boston, MA (US)

(72) Inventors: Hangyu Wang, Cary, NC (US); Yiming Li, Dalian (CN); Yibo He, Dalian (CN); Dong Han, Dalian (CN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 19/000,892

(22) Filed: Dec. 24, 2024

(51) Int. Cl.
*B25J 9/16* (2006.01)
*G06F 3/01* (2006.01)
*G06F 40/20* (2020.01)

(52) U.S. Cl.
CPC ........... *B25J 9/1671* (2013.01); *B25J 9/1653* (2013.01); *B25J 9/1666* (2013.01); *G06F 3/011* (2013.01); *G06F 40/20* (2020.01)

(58) Field of Classification Search
CPC ...... B25J 9/1671; B25J 9/1653; B25J 9/1666; G06F 3/011; G06F 40/20
See application file for complete search history.

(56) References Cited

U.S. PATENT DOCUMENTS

| | | | |
|---|---|---|---|
| 11,931,894 B1 | 3/2024 | Rose et al. | |
| 2011/0307860 A1* | 12/2011 | Park | G06F 8/30 717/145 |
| 2016/0148417 A1* | 5/2016 | Kim | G06F 3/14 345/419 |
| 2020/0171671 A1* | 6/2020 | Huang | B25J 9/0084 |
| 2023/0070517 A1* | 3/2023 | Sharma | G06F 11/3684 |
| 2023/0311335 A1 | 10/2023 | Hausman et al. | |
| 2023/0385085 A1 | 11/2023 | Singh | |
| 2025/0021424 A1* | 1/2025 | Uniyal | G06F 11/3457 |

OTHER PUBLICATIONS

D. Zhu et al., "MiniGPT-4: Enhancing Vision-Language Understanding with Advanced Large Language Models," arXiv:2304.10592v2 [cs.CV], Oct. 2, 2023, accessed at https://arxiv.org/abs/2304.10592, 15 pages.

T. Zhang et al., "Deep Imitation Learning for Complex Manipulation Tasks from Virtual Reality Teleoperation," arXiv:1710.04615v2 [cs.LG], Mar. 6, 2018, accessed at https://arxiv.org/abs/1710.04615, 9 pages.

* cited by examiner

*Primary Examiner* — Jason Holloway
(74) *Attorney, Agent, or Firm* — Cesari and McKenna, LLP (57) ABSTRACT

Methods and systems for automated testing of virtual reality software applications using robotic devices include a server that converts a test workflow description into a sequence of actions in a format interpretable by a robotic device. The server transmits the sequence of actions to the robotic device. For each action in the sequence of actions, the server a) receives, from the robotic device, execution data corresponding to an outcome of execution of the action by the robotic device; b) captures, from a virtual reality device, one or more of image data and vector data corresponding to a current state of a virtual reality software application; c) analyzes one or more of the image data, the vector data, and the execution data to determine whether the robotic device successfully executed the action; and d) upon determining that the robotic device successfully executed the action, repeats steps a)-d) for the next action.

24 Claims, 6 Drawing Sheets

```
{
    car: <idle | moving | fault>
    head: <idle | moving | fault>
    armLeft: <idle | moving | fault>
    armRight: <idle | moving | fault>
    surroundings:{
        left: xx-cm,
        right: xx-cm,
        front: xx-cm,
        behind: xx-cm
    }
}
```

AUTOMATED TESTING OF VIRTUAL REALITY SOFTWARE APPLICATIONS USING ROBOTIC DEVICES

TECHNICAL FIELD

This subject matter of this application relates generally to methods and apparatuses, including computer program products, for automated testing of virtual reality software applications using robotic devices.

BACKGROUND

In recent years, hardware such as headsets, adapters, and viewers used in virtual reality (VR), mixed reality (MR), or augmented reality (AR) environments have become widely available. In the case of VR, a user sees a visual environment comprised entirely of computer-generated graphical objects and in the case of AR or MR, a user sees a visual environment comprised of both real-world objects and computer-generated graphics. In either case, the user can interact with the environment by moving his head and/or hands—such movements are captured by the hardware and translated into the computerized environment using specialized application software. As a result, the demand for automated testing of software applications using robotic devices is on an upward trajectory.

However, traditional methods of performing such automated testing are plagued by low efficiency and poor adaptability. They often rely heavily on manual labor, where human testers manually interact with the VR applications on a physical device. Even in cases where robots are utilized to assist with testing, a human developer is required to analyze performance of the robotic device during execution of the application test workflow to ensure that the robot is completing tasks successfully, while also monitoring the state of the VR application under test to ensure that its performance conforms to expectations. Consequently, the development of an intelligent robotic system capable of automatically understanding, performing, and validating application tasks and operations in VR software is of paramount importance.

SUMMARY

The methods and systems described herein overcome the above challenges that exist in current automated VR application testing systems by providing automated generation of software application test workflows using advance large language models that can be executed by a trained robotic device without human intervention or monitoring. Advantageously, the techniques described herein enable the automatic conversion of test documentation to atomic actions that are known to and can be executed by a robotic device for the purpose of carrying out the software test. In addition, the systems and methods beneficially utilize advanced algorithms to analyze the outcome of each software test step and determine whether the robotic device successfully executed the tasks.

The invention, in one aspect, features a system for automated testing of virtual reality software applications using robotic devices. The system includes a server computing device, a robotic device in communication with the server computing device, and a virtual reality device in communication with the server computing device and executing a virtual reality software application to generate and display a virtual reality environment. The server computing device converts a test workflow description into a sequence of actions in a format interpretable by the robotic device. The server computing device transmits the sequence of actions to the robotic device for execution. For each action in the sequence of actions, the server computing device a) receives, from the robotic device, execution data corresponding to an outcome of execution of the action by the robotic device; b) captures, from the virtual reality device, one or more of image data and vector data corresponding to a current state of the virtual reality software application; c) analyzes one or more of the image data, the vector data, and the execution data to determine whether the robotic device successfully executed the action; and d) upon determining that the robotic device successfully executed the action, repeats steps a)-d) for the next action in the sequence of actions.

The invention, in another aspect, features a computerized method of automated testing of virtual reality software applications using robotic devices. A server computing device converts a test workflow description into a sequence of actions in a format interpretable by a robotic device in communication with the server computing device. The server computing device transmits the sequence of actions to the robotic device for execution. For each action in the sequence of actions, the server computing device a) receives, from the robotic device, execution data corresponding to an outcome of execution of the action by the robotic device; b) captures, from a virtual reality device in communication with the server computing device and executing a virtual reality software application to generate and display a virtual reality environment, one or more of image data and vector data corresponding to a current state of the virtual reality software application; c) analyzes one or more of the image data, the vector data, and the execution data to determine whether the robotic device successfully executed the action; and d) upon determining that the robotic device successfully executed the action, repeats steps a)-d) for the next action in the sequence of actions.

Any of the above aspects can include one or more of the following features. In some embodiments, converting the test workflow description into the sequence of actions comprises providing the test workflow description and an instruction prompt as input to a large language model and generating, using the large language model, the sequence of actions by converting the test workflow description into a plurality of tasks based upon the instruction prompt, and mapping each of the plurality of tasks to an action performable by the robotic device. In some embodiments, the execution data comprises one or more status indicators each corresponding to a physical feature of the robotic device. In some embodiments, each status indicator is associated with a timestamp of execution of the action by the robotic device. In some embodiments, the physical features of the robotic device include one or more of: a left arm, a right arm, a head, a movement mechanism, and a physical environment sensor.

In some embodiments, the image data captured from the virtual reality device comprises a screen capture of the virtual reality software application. In some embodiments, the vector data captured from the virtual reality device comprises (i) object vector data associated with one or more target objects in the virtual reality environment and (ii) device vector data associated with the virtual reality device. In some embodiments, analyzing one or more of the image data, the vector data, and the execution data to determine whether the robotic device successfully executed the action comprises identifying a fault state of the robotic device using the execution data and determining that the robotic device did not successfully execute the action based upon the fault state. In some embodiments, analyzing one or more of the image data, the vector data, and the execution data to determine whether the robotic device successfully executed the action comprises comparing the object vector data to the device vector data to determine a difference between the object vector data to the device vector data and determining that the robotic device successfully executed the action based upon the difference between the object vector data and the device vector data. In some embodiments, analyzing one or more of the image data, the vector data, and the execution data to determine whether the robotic device successfully executed the action comprises providing the image data and an expected result of the action as input to a large language model and determining, using the large language model, whether the robotic device successfully executed the action by comparing one or more aspects of the image data to the expected result of the action. In some embodiments, analyzing one or more of the image data, the vector data, and the execution data to determine whether the robotic device successfully executed the action comprises providing a plurality of images from the image data as input to a large language model, calculating, using the large language model, a phase difference between one or more objects depicted in the image data across the plurality of images, and determining whether the robotic device successfully executed the action based upon the phase difference.

In some embodiments, when executing the action, the robotic device captures physical environment data from one or more sensors coupled to the robotic device, determines one or more obstacles based upon the physical environment data, and modifies the action based upon the determined obstacles. In some embodiments, the server computing device further generates a new action for insertion into the sequence of actions based upon the image data and transmits the new action to the robotic device for execution. In some embodiments, the vector data comprises one or more of x-coordinate data, y-coordinate data, z-coordinate data, and velocity data.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
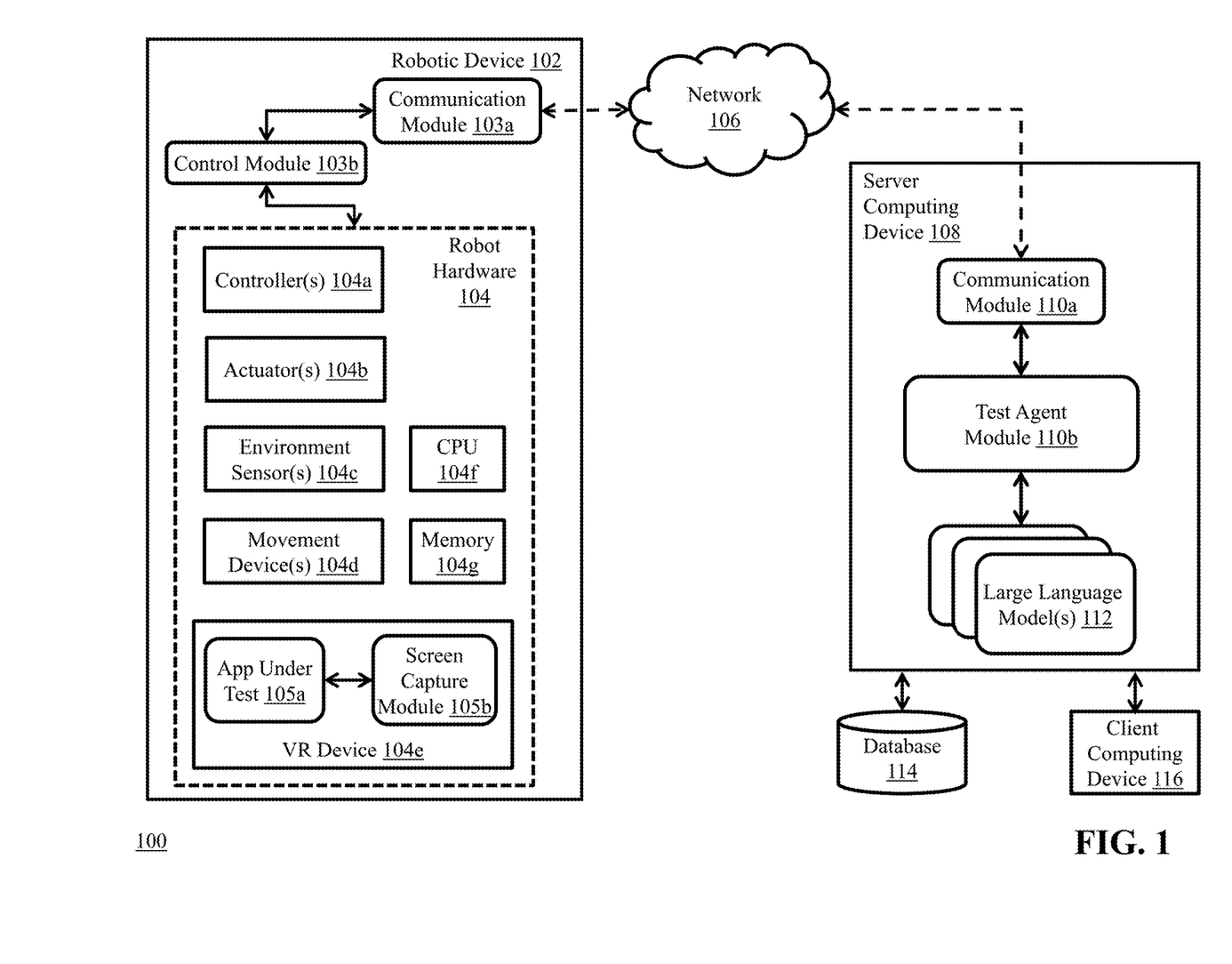
FIG. 1 is a block diagram of a system for automated testing of virtual reality software applications using robotic devices.

FIG. 1 is a block diagram of system 100 for automated testing of virtual reality software applications using robotic devices. System 100 includes robotic device 102 with communication module 103a, control module 103b, and a plurality of hardware components (collectively, robot hardware 104) including controller(s) 104a, actuator(s) 104b, environment sensor(s) 104c, movement device(s) 104d, virtual reality device 104e with software including application under test 105a and screen capture module 105b, central processing unit (CPU) 104f, and memory 104g. System 100 further includes communication network 106, server computing device 108, database 114, and client computing device 116. Server computing device 108 includes communication module 110a, test agent module 110b, and large language model(s) (LLMs) 112.

In some embodiments, robotic device 102 (or robot) is a machine comprised of one or more interconnected mechanical devices configured to carry out complex tasks in a physical environment based upon programmatic instructions. Often, the tasks are intended to replicate human movements or functions. For example, a robot may have one or more arms that can move in three-dimensional space to, e.g., interact with objects in the physical environment around the robot. In another example, a robot may have one or more movement devices that enable the robot to move around within the physical environment. In yet another example, a robot may be equipped with sensor devices that enable the robot to detect and interpret characteristics of the surrounding physical environment to aid in completion of its tasks.

As shown in FIG. 1, robotic device 102 includes communication module 103a that establishes a connection to network 106 in order for robot 102 to exchange data communications with server computing device 108 via network 106. In some embodiments, communication module 103a is comprised of hardware (e.g., network circuitry, antennae) and/or software that enables robot 102 to connect to network either via a wired or wireless connection.

In some embodiments, communication module 103a is configured to communicate with communication module 110a of server computing device 108 via one or more specialized application programming interfaces (APIs). Generally, an API is a collection of functions, procedures, definitions, and protocols that enable integration of application software. API requests and responses can be exchanged between robotic device 102 and server computing device 108 using any of a number of different architectures, including but not limited to: Representational State Transfer (REST) or Simple Object Access Protocol (SOAP). In one example, robotic device 102 and server computing device are configured to communicate using a plurality of different APIs—each corresponding to one of the hardware components of device 102. For example, communication module 103a of robotic device 102 can receive programmatic instructions from communication module 110a of server computing device 108 via a first API for activation and control of movement device(s) 104d, and communication module 103a can receive programmatic instructions from communication module 110a of server computing device 108 via a second API for activation and control of actuator(s) 104b for a head of the robot 102.

Communication module 103a is coupled to control module 103b, which is configured to receive programmatic instructions from communication module 103a and convert the programmatic instructions into signals that activate and control hardware 104 of robot. Control module 103b can transmit the signals to hardware 104 (i.e., components 104a-104g) for operation of mechanical features of the hardware 104. Control module 103b is also configured to receive signals from hardware 104 resulting from the operation of the mechanical features and analyze the result signals to determine, e.g., whether the hardware successfully carried out the operation or not. In some embodiments, at least a portion of control module 103b is integrated into each of one or more controller(s) 104a, such programmatic instructions received from server computing device 108 that are directed to specific components 104a-104g are transmitted directly from communication module 103a to the corresponding controller(s) 104a which are configured to execute control module 103b as described herein.

Controller(s) 104a are configured to receive signal(s) corresponding to programmatic instructions from control module 103b and activate one or more of the other components 104b-104g of robot 102 according to the signal(s). For example, controller(s) 104a can be coupled to one or more actuators 104b that effect movement of, e.g., a robotic arm of device 102. Upon receiving signal(s) from module 103b, controller(s) 104a can activate actuators 104b according to the signal(s) to move the robotic arm in a desired manner. An exemplary controller 104a used in robotic device 102 can be a microcontroller such as the Raspberry Pi Pico™ 2, available from Raspberry Pi Ltd. of Cambridge, U.K. In some embodiments, robot 102 comprises a plurality of controllers 104a, each coupled to a different component 104b-104g of the device 102. Actuator(s) 104b comprise mechanical devices that, when activated by controller(s) 104a, produce physical motion (e.g., rotary motion, linear motion) based on the signal received from the controller(s) 104a. In some embodiments, the physical motion comprises movement in one or more degrees of freedom (DoF). Actuator(s) 104b can include, but are not limited to, electric actuators (i.e., servomotors, stepper motors, direct current motors), hydraulic actuators, and pneumatic actuators.

Environment sensor(s) 104c are configured to detect and interpret characteristics of the physical environment surrounding the robot 102 as the robot is carrying out its tasks. For example, environment sensor(s) 104c can capture data associated with the physical environment and transmit the data to, e.g., controller(s) 104a, communication module 103, and/or server computing device 108 for interpretation. Sensor(s) 104c can include, but are not limited to, video cameras, microphones, photoresistors, infrared sensors, motion detection sensors, and proximity sensors. Movement device(s) 104d are configured to physically move the robot 102 within the surrounding environment. For example, movement device(s) 104d can receive instructions from one or more controller(s) 104a and execute the instructions to move the robot 102 (e.g., according to an x-y coordinate system or other type of movement system). Movement device(s) 104d can include, but are not limited to, wheels, treads, and legs.

In some embodiments, virtual reality (VR) device 104e comprises a headset device affixed to the robotic device 102 that is configured to generate and display a three-dimensional virtual environment through execution of one or more software applications. In some embodiments, VR device 104e includes graphics processing unit (GPU) hardware and/or central processing unit (CPU) hardware, memory (e.g., solid state RAM), microphones, a display/lens apparatus (e.g., one or more micro-OLED displays that can adjustably display digital content), one or more cameras, one or more sensors (e.g., accelerometers, gyroscopes), networking hardware (e.g., Bluetooth™, WiFi™), and battery. VR device 104e is configured to execute one or more software applications, including application under test 105a and screen capture module 105b. In some embodiments, application under test 105a comprises software executed by VR device 104e, including functionality to generate and display a virtual environment—such as a fully-immersive VR environment, an augmented reality (AR) environment, a mixed reality (MR) environment, and/or an extended reality (XR) environment. In one embodiment, robotic device 102 has a partial human form (i.e., a head, torso, and two arms) and VR device 104e is worn on the head of the robotic device 102, much like a human would wear it.

As described in detail in this specification, the programmatic instructions received by robotic device 102 from server computing device 108 can be associated with a script or workflow intended to test functionality of the application under test 105a using the robotic device 102. Screen capture module 105b comprises software that is configured to collect screenshots of application under test 105a (e.g., during execution of a test workflow) and transmit the captured images to server computing device 108 for analysis. In some embodiments, screen capture module 105b collects screenshots directly from application under test 105a executing on VR device 104e. In some embodiments, screen capture module 105b is configured to execute on a separate computing device coupled to VR device 104e, where VR device 104e casts the VR display of application 105a to the computing device and module 105b captures the screenshots from the separate computing device for transmission to server computing device 108. Exemplary VR devices 104e include, but are not limited to, the Apple® Vision Pro™ headset from Apple, Inc., Meta® Quest™ 3 from Meta Platforms, Inc., or HTC® Vive Pro™ 2 from HTC Corp. Robotic device 102 also includes one or more processors (e.g., CPU 104f) and one or more memory devices (e.g., memory 104g) for, e.g., executing software applications such as communication module 103a and control module 103b and/or other software of robotic device 102.

Communication network 106 enables robotic device 102 to communicate with server computing device 108. Network 104 may be a local network, such as a LAN, or a wide area network, such as the Internet and/or a cellular network. In some embodiments, network 104 is comprised of several discrete networks and/or sub-networks (e.g., cellular to Internet) that enable communication between robotic device 102 and server computing device 108. In some embodiments, database 114 and/or client computing device 116 are configured to communicate with server computing device 108 via network 106.

Server computing device 108 is a combination of hardware, including one or more special-purpose processors and one or more physical memory modules, and specialized software modules—such as communication module 110a, test agent module 110b, and large language model(s) 112—that execute on one or more processors of server computing device 108, to receive data from other components of system 100, transmit data to other components of system 100, and perform functions for automated testing of virtual reality software applications using robotic devices as described herein. In some embodiments, modules 110a-110b and LLMs 112 are specialized sets of computer software instructions programmed onto one or more dedicated processors in server computing device 108 and can include specifically designated memory locations and/or registers for executing the specialized computer software instructions. It should be appreciated that any number of computing devices, arranged in a variety of architectures, resources, and configurations (e.g., cluster computing, virtual computing, cloud computing) can be used without departing from the scope of the invention. Further explanation of the specific processing performed by modules 110a-110b and LLMs 112 is provided below.

Generally, large language models (LLMs) 112 comprise deep learning computational models executed by one or more processors of server computing device 108 that are trained on vast amounts of training data (e.g., text, images) to comprehend and generate human language text. Often, a text description (also called a prompt) is provided as input to the LLM, which analyzes the prompt to determine the expected result and process relevant context used to generate corresponding output in the form of another text description. In some embodiments, LLMs 112 are configured as multi-modal models in that they can receive and analyze not only text as input, but also still images, video, audio, or other media. In some embodiments, LLMs 112 can receive text and/or images associated with a task intended for, or currently being carried out by, robotic device 102 and process the input to generate output such as a sequence of actions for the robot, calculations or analyses of robot performance, and so forth. In some embodiments, LLMs 112 are based on foundational models such as Generative Pretrained Transformer 4 (GPT-4), available from OpenAI or MiniGPT-4 (described in D. Zhu et al., "MiniGPT-4: Enhancing Vision-Language Understanding with Advanced Large Language Models," arXiv: 2304.10592v2 [cs.CV], Oct. 2, 2023, available at arxiv.org/pdf/2304.10592, which is incorporated herein by reference).

Database 114 is a computing device (or, in some embodiments, a set of computing devices) comprising transient and/or persistent memory for data storage, which is used in conjunction with the process of automated testing of virtual reality software applications using robotic devices as described herein. Client computing device 116 connects to server computing device 108 as part of the process for automated testing of virtual reality software applications as described herein. For example, a user of client computing device 116 can be a developer or software tester that is responsible for executing test workflow against the application under test 105a using robotic device 102. Although FIG. 1 depicts a single client computing device 116, it should be appreciated that system 100 can comprise any number of remote computing devices. In some embodiments, client computing device 116 is coupled to a display device (not shown). For example, client computing device 116 can provide a detailed graphical user interface (GUI) via the display device that presents application test data inputs and/or outputs to the user of device 116 for analysis. Exemplary client computing devices 116 include, but are not limited to, desktop computers, laptop computers, tablets, mobile devices, smartphones, and internet appliances. It should be appreciated that other types of computing devices that are capable of connecting to the components of system 100 can be used without departing from the scope of invention.

Figure 2:
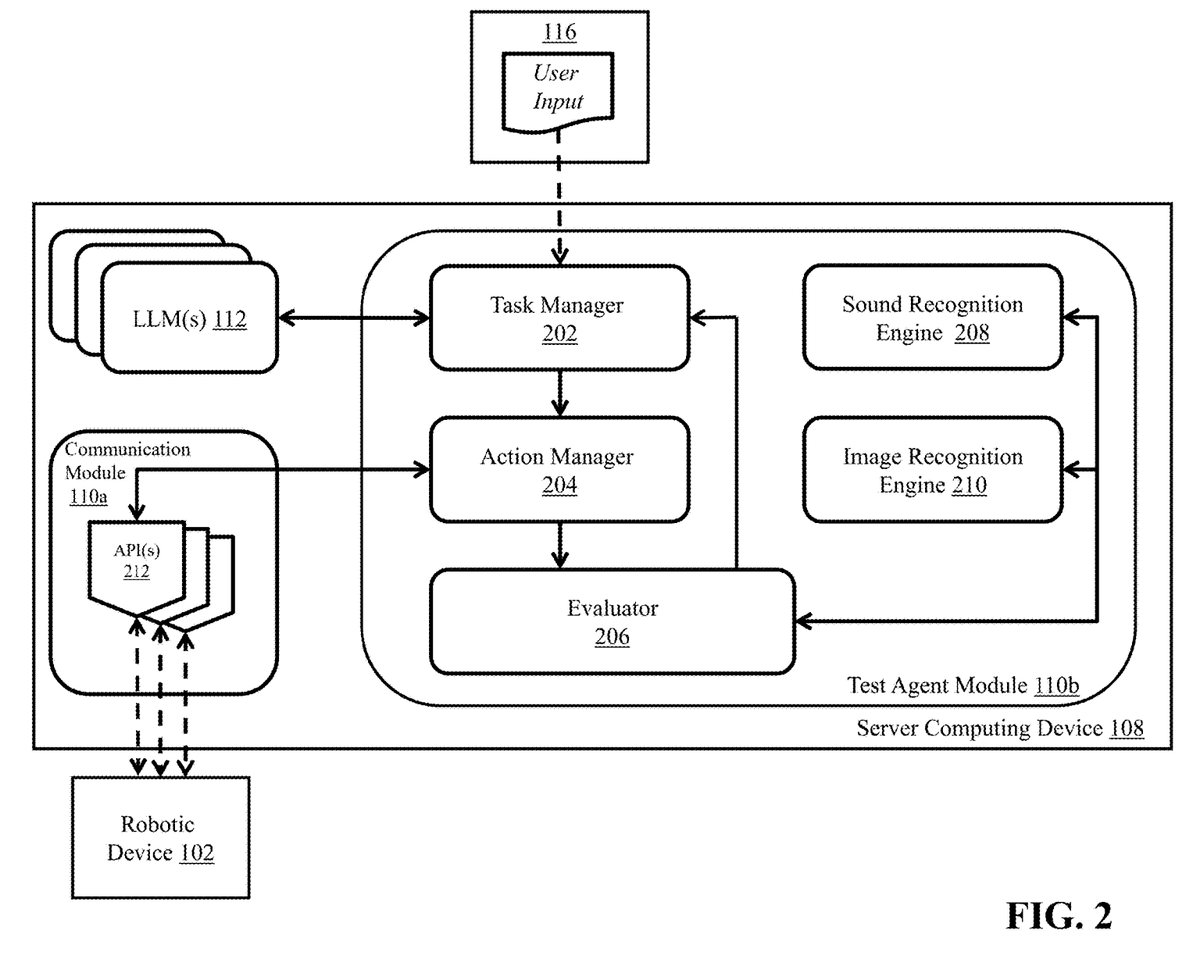
FIG. 2 is a detailed block diagram of a communication module and test agent module of a server computing device for automated testing of virtual reality software applications using robotic devices.

FIG. 2 is a detailed block diagram of communication module 110a and test agent module 110b of FIG. 1, used for automated testing of virtual reality software applications using robotic devices. As shown in FIG. 2, test agent module 110b comprises a plurality of sub-modules: task manager 202, action manager 204, evaluator 206, sound recognition engine 208, and image recognition engine 210. Task manager 202 is configured to receive user input from client computing device 116 and generate a task workflow description based upon the user input by executing one or more of large language model(s) 112. Generally, the user input can comprise developer/QA documentation that contains test cases for testing, e.g., application under test 105a on VR device 104e. In some embodiments, the user input takes the form of a prompt (e.g., a text-based set of instructions) that can be directly provided to LLM(s) 112 for analysis and generation of a corresponding response. For example, the prompt may comprise (i) a direct instruction to the LLM which includes a short description of the test workflow to be generated by the LLM; and (ii) an example test workflow for, e.g., a different test case that provides context to the LLM for generating the desired test workflow. Task manager 202 receives the user input from client computing device 116 and generates the task workflow description using LLM(s) 112 to analyze the user input and generate corresponding output in the form of a test workflow description. In some embodiments, the test workflow description comprises a plurality of individual tasks (sometimes arranged in a defined sequence) to be performed by the robot in order to complete the desired test workflow. Task manager 202 provides the test workflow description to action manager 204.

Action manager 204 is configured to receive the test workflow description from task manager 202 and generate a sequence of actions that correspond to the test workflow description and that can be performed by the robotic device 102, where the sequence of actions is generated in a format interpretable by the robotic device 102. In some embodiments, robotic device 102 is pre-trained to perform a discrete set of operations using imitation learning. Generally, imitation learning comprises a training phase where a human operator performs various tasks using a VR device and VR controller to control the robot 102, while the robotic device 102 concurrently observes the human operator's movements and learns to perform the same operations. An exemplary imitation learning methodology that can be used to train robot 102 is described in T. Zhang et al., "Deep Imitation Learning for Complex Manipulation Tasks from Virtual Reality Teleoperation," arXiv: 1710.04615v2 [cs.LG], Mar. 6, 2018, available at arxiv.org/pdf/1710.04615, which is incorporated by reference herein. Action manager 204 is configured to store the set of operations available to the robot 102 through imitation learning and associate each of the tasks outlined in the task workflow description with one or more of the learned operations.

Action manager 204 then transmits each action in the sequence of actions to communication module 110a for transmission to robotic device 102 via API(s) 212. In some embodiments, action manager 204 transmits a first action in the sequence of actions to robot 102 and waits to receive and process a response to the first action from robot 102 before transmitting the next action in the sequence of actions. For example, upon receiving a response to the first action, action manager 204 can transmit the response to evaluator 206 for processing (i.e., validation that the first action completed successfully) before proceeding to transmit the next action to robot 102.

Evaluator 206 receives output from action manager 204 relating to execution of the current action by the robotic device 102 and analyzes the output to determine whether the robot 102 successfully completed the action (or not). In some embodiments, the response received from robot 102 comprises execution data (e.g., status indicators each associated with an atomic action performed by robot 102 or a current state of a physical feature of the robot 102), image data (e.g., screen captures from VR device 104e that depict a current state of application under test 105a), and/or vector data (e.g., object vector data associated with one or more target objects in the virtual reality environment displayed in VR device 104e and device vector data associated with VR device 104e). Evaluator 206 analyzes the execution data, image data, and/or vector data to determine whether the action was successful. If so, evaluator 206 instructs action manager 204 to proceed with execution of the next action in the sequence of actions.

In some embodiments, evaluator 206 can use sound recognition engine 208 and/or image recognition engine 210 to assist in making determinations of whether the robot 102 successfully completed the action. For example, testing of certain functionality of application under test 105a may require the capture and analysis of sound generated by application 105a—e.g., visually impaired people may rely on sound playback to navigate features of application 105a. Robotic device 102 can be equipped with one or more microphones to capture sound output from VR device 104e and transmit the captured sound output to action manager 204 upon completion of a specified action. Upon receiving the captured sound output from action manager 204, evaluator 206 transmits the sound output to sound recognition engine 208. Engine 208 analyzes the sound output to, e.g., validate that the sound output matches a sound expected from application 105a/VR device 104e during the test.

Image recognition engine 210 can receive the image data and/or vector data from evaluator 206 and analyze the data to (i) determine whether the current action was successfully completed by robot 102 and (ii) guide the robot 102 in the execution of subsequent actions during the test workflow. In some embodiments, image recognition engine 210 can compare one or more characteristics of the image data to an expected state of the application under test 105a in order to determine whether the current action was completed successfully. For example, a screen capture from application under test 105a may depict the location of a target object in the virtual environment after completion of the current action and image recognition engine 210 can determine vector data, such as coordinates (e.g., x-y-z), for the target object in the environment. However, according to the test workflow, after completion of the current action the target object is expected to be in a different location. Image recognition engine 210 can transmit the target object vector data to evaluator 206, which compares the target object vector data to expected vector data and determines that the robot 102 did not complete the action successfully and/or the application under test 105a has an error. Evaluator 206 can then instruct action manager 204 to, e.g., revise the next action in the sequence of actions and/or trigger an error reporting process with client computing device 116.

In some embodiments, image recognition engine 210 can analyze the image data received from evaluator 206 across multiple frames in conjunction with LLMs 112 as part of a process to guide the robot's performance during the test workflow. As mentioned above, in some embodiments the application under test 105a may comprise a target object in the virtual environment with which the robot 102 is intended to interact in some way by operation of VR device 104e. At each action in the sequence of actions, screen capture module 105b can capture real-time visual data of the VR environment (e.g., via screenshots), including the visual representation and/or the location of one or more of the target object and the VR device, and transmit the screenshots to action manager 204 and image recognition engine 210, which use the current action to identify names and positions of the target object(s) involved. By recognizing the target objects, action manager 204 can determine a phase relationship between the robot 102 and the target object(s) across multiple frames using LLM(s) 112, thereby controlling the robot's 102 movement after each action.

For example, a plurality of screenshots can be provided to LLM(s) 112 as input along with an instruction prompt that describes (i) the task being performed by the robot, (ii) identification of the target object(s) and robot/VR device, and (iii) a desired reply from the LLM 112 (i.e., determine the calculated phase difference for the robot/VR device and target object(s), which is the relative movement and positioning of the robot/VR device and the target object over time). The LLM 112 analyzes the screenshots and task description to generate the calculated phase difference, and the action manager 204 uses the calculated phase difference to control the robot 102 during subsequent actions. In some embodiments, action manager 204 uses the output from LLM 112 to perform one or more of the following functions:

1. Phase Analysis: The phase relationship indicates how the position and orientation of the robot change relative to the target object across multiple frames. This analysis helps in understanding the trajectory and movement pattern required to approach the target object.
2. Movement Planning: Based on the calculated phase difference, the robot's control system can plan a precise movement path. This involves adjusting the robot's speed, direction, and orientation to ensure it moves towards the target object in a smooth and controlled manner.
3. Real-Time Adjustments: As the robot moves, screen capture module 105b continues to capture new frames, and the action manager 204/LLM 112 continuously updates the phase relationship. This allows the robot to make real-time adjustments to its movement, ensuring it stays on the correct path and responds to any changes in the environment.
4. Task Completion: The robot follows the planned path until the task is completed. The continuous feedback loop between the visual data, phase relationship analysis, and movement control ensures precise and adaptive robot behavior.

Figure 3:
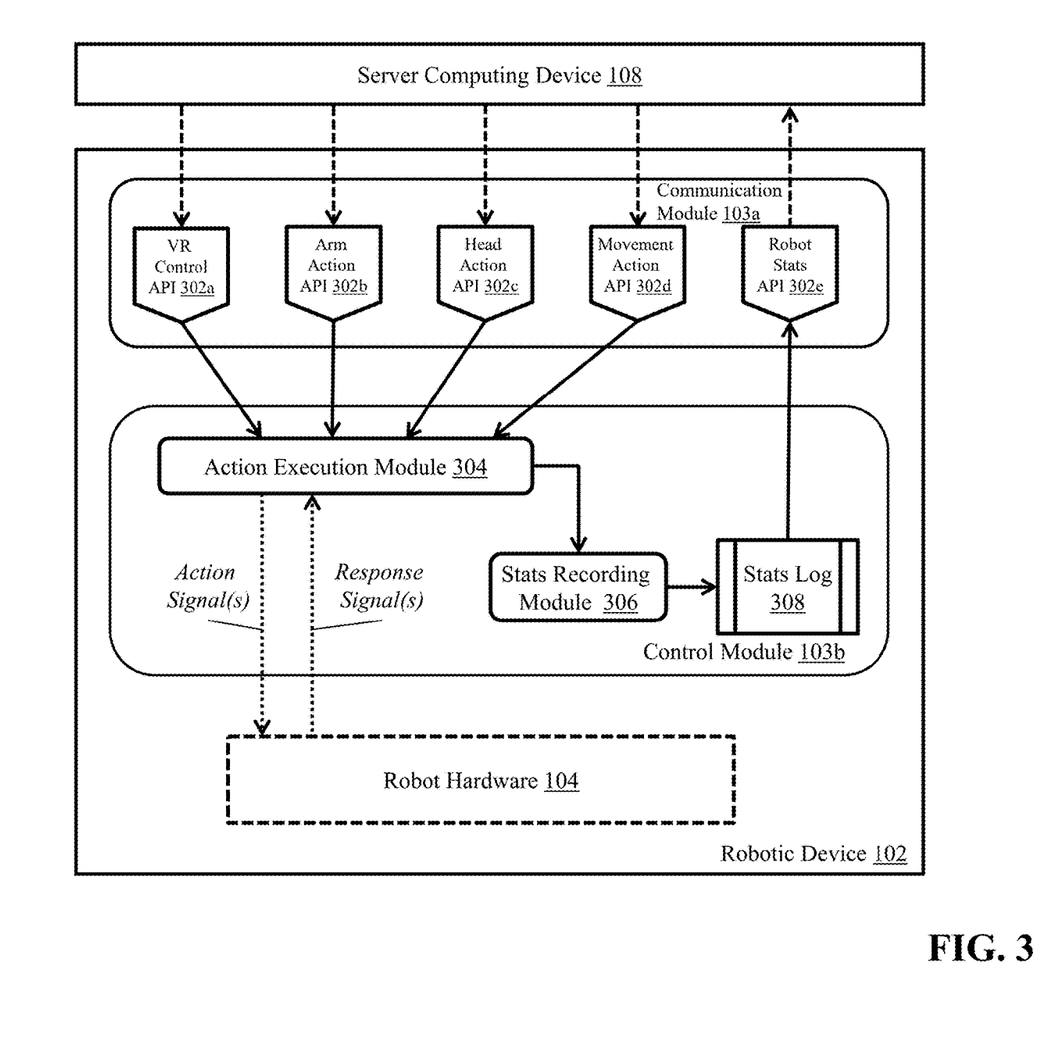
FIG. 3 is a detailed block diagram of a communication module and a control module of a robotic device for automated testing of virtual reality software applications.

FIG. 3 is a detailed block diagram of communication module 103a and control module 103b of robotic device 102 of FIG. 1, used for automated testing of virtual reality software applications. As shown in FIG. 3, communication module 103a includes a plurality of APIs 302a-302e that coordinate communications between server computing device 108 and action execution module 304 of control module 103b. As described previously, in some embodiments each control API 302a-302d exchanges messages with communication module 110a of server computing device 108 (which is configured with the same set of APIs), where each message relates to a specific component 104a-104e of robotic device 102 to be activated. For example, VR control API 302a can receive messages that contain instructions for control of VR device 104e, including application under test 105a and screen capture module 105b; arm control API can receive messages that contain instructions for control of one or more arms of robotic device 102 via controller(s) 104a and actuator(s) 104b; head control API 302c can receive messages that contain instructions for control of a head of robotic device 102 via controller(s) 104a and actuator(s) 104b; and movement control API 302d can receive messages can receive messages that contain instructions for control of one or more movement device(s) 104d of robotic device 102. Robot stats API 302e can generate messages that contain results (e.g., status indicators, log entries, etc.) generated from operation of robotic device 102 recorded in stats log 308 for transmission back to server computing device 108.

As shown in FIG. 3, control module 103b includes action execution module 304, stats recording module 306, and stats log 308. Action execution module 304 receives API messages from control APIs 302a-302d and converts the instructions contained in the API messages into action signal(s) (e.g., electronic signals) that are transmitted to robotic device 102 for activation of the corresponding hardware component(s) 104a-104e. In some embodiments, hardware 104 returns response signal(s) to action execution module 304 after activation to, e.g., indicate that the activation has taken place and/or other applicable outcome data from the activation (e.g., fault conditions). For each action and/or activation instructions conveyed to robot hardware 104, action execution module 304 transmits outcome data to stats recording module 306. Stats recording module 306 generates a corresponding log entry in stats log 308, and server computing device 108 can call robot stats API 302e to retrieve stats log data from log 308. In some embodiments, stats log 308 is a local in-memory cache that temporarily stores one or more log entries for retrieval by server computing device 108 via API 302e.

Figure 4:
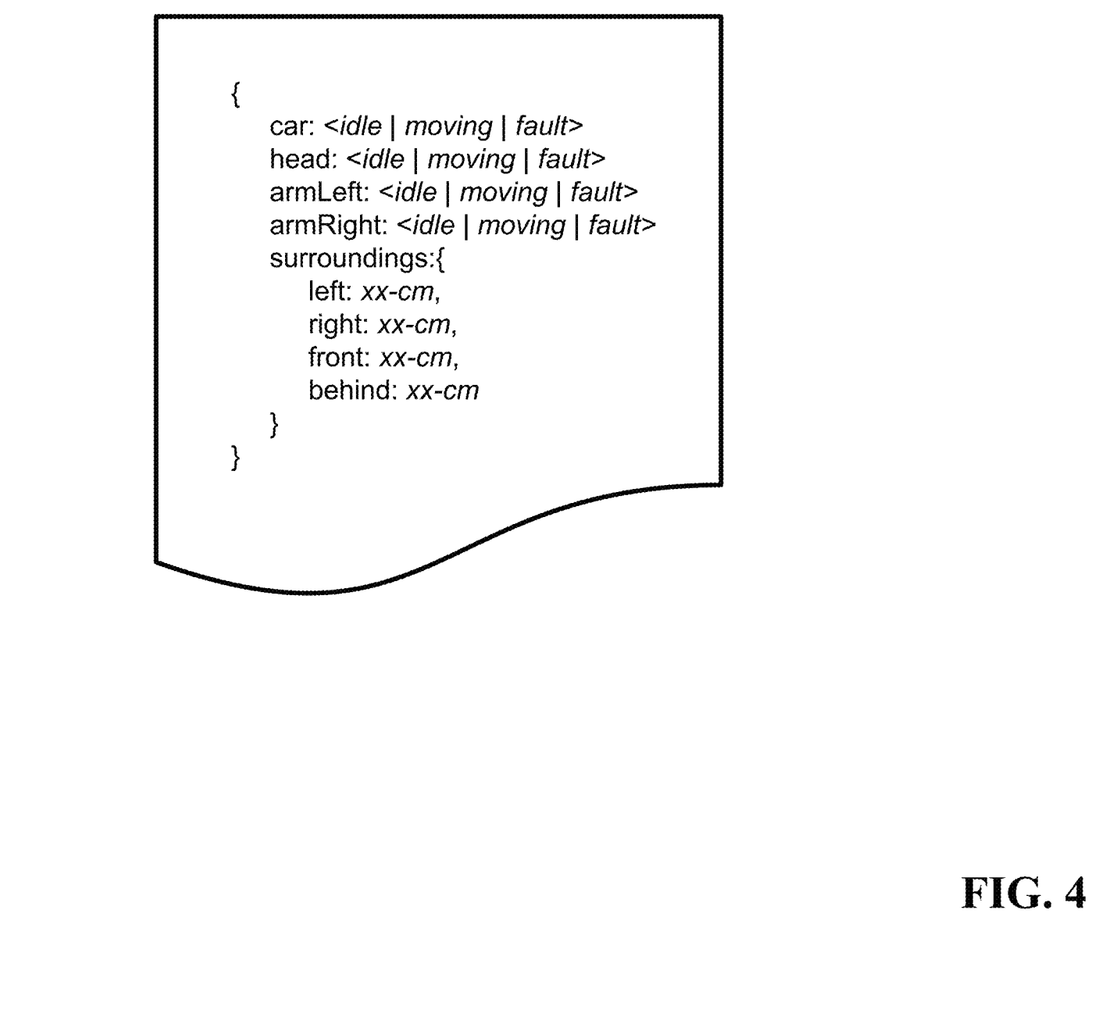
FIG. 4 is a diagram of an exemplary response message generated by a control module of a robotic device.

Upon receiving a request from server computing device 108 for data via robot stats API 302e and/or upon detecting that a new log entry has been written to stats log 308 by module 306, control module 103b generates a response message that comprises data elements from stats log 308. FIG. 4 is a diagram of an exemplary response message 400 generated by control module 103b. As shown in FIG. 4, response message 400 comprises a plurality of status indicators, i.e., key-value pairs, each corresponding to a particular component (e.g., components 104a-104e) of robotic device 102. In some embodiments, the value of each key-value pair comprises a status of the component at the conclusion of the most recent action executed by the robot 102—for example, the key 'head' may be associated with a value from one of three options: 'idle,' 'moving,' or 'fault,' based upon the status of the robot head after execution of the action. In this example, a 'fault' value indicates that the corresponding component 104a-104e of the robotic device 102 was unable to successfully execute the action (e.g., the requested action is beyond the capabilities of the component) and/or the corresponding component 104a-104e is in an error state (e.g., malfunctioning).

In some embodiments, stats recording module 306 writes a log entry to stats log 308 after each action is executed by robotic device 102 and each log entry comprises a key-value pair (see FIG. 4) for all of the available components 104a-104e of robotic device 102. In some embodiments, the log entries also include one or more timestamps (e.g., a timestamp denoting when the robotic device 102 started and/or finished the associated action) and/or one or more values that comprise an amount of time (e.g., in milliseconds or seconds) that elapsed between the start and the finish of the action by the robotic device 102. Upon receiving the stats log response message, server computing device 108 processes the message to determine whether the robotic device 102 successfully completed the action—as will be described in greater detail below with respect to FIG. 5.

Figure 5:
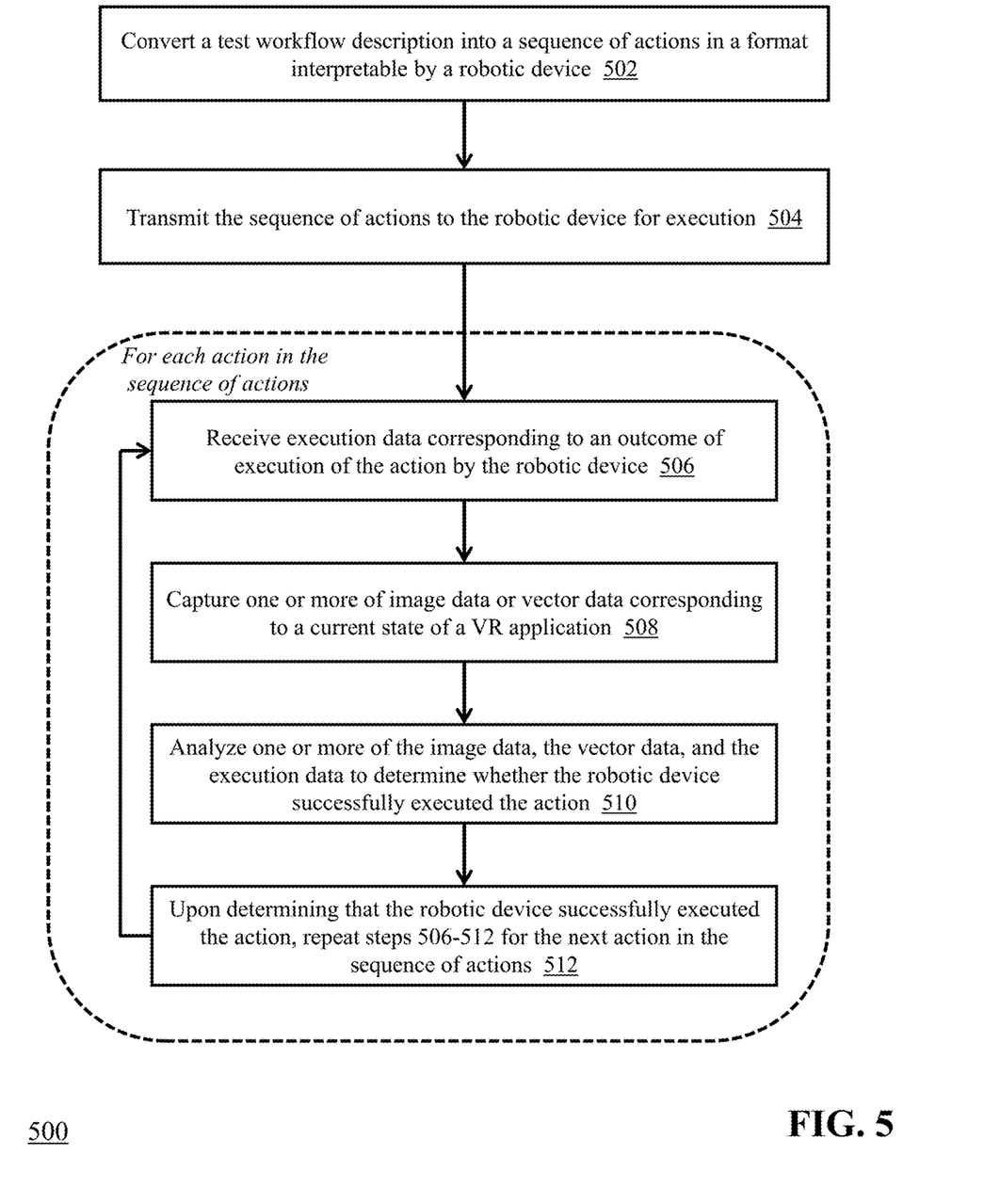
FIG. 5 is a flow diagram of a computerized method of automated testing of virtual reality software applications using robotic devices.

FIG. 5 is a flow diagram of a computerized method 500 of automated testing of virtual reality software applications using robotic devices, using system 100 of FIG. 1. A user at client computing device 116 establishes a communication session with server computing device 108 and interacts with one or more software applications on the device 116 to initiate execution of a test workflow for application under test 105a on VR device 104e using robotic device 102. For example, the user can launch a browser application on client computing device 116 to connect to and access one or more resources (e.g., web applications) of server computing device 108. In some embodiments, a UI module of server computing device 108 generates a user interface screen for display on client computing device 116 that enables the user to, e.g., provide input for a test workflow to be executed and also initiate the test workflow.

Figure 6:
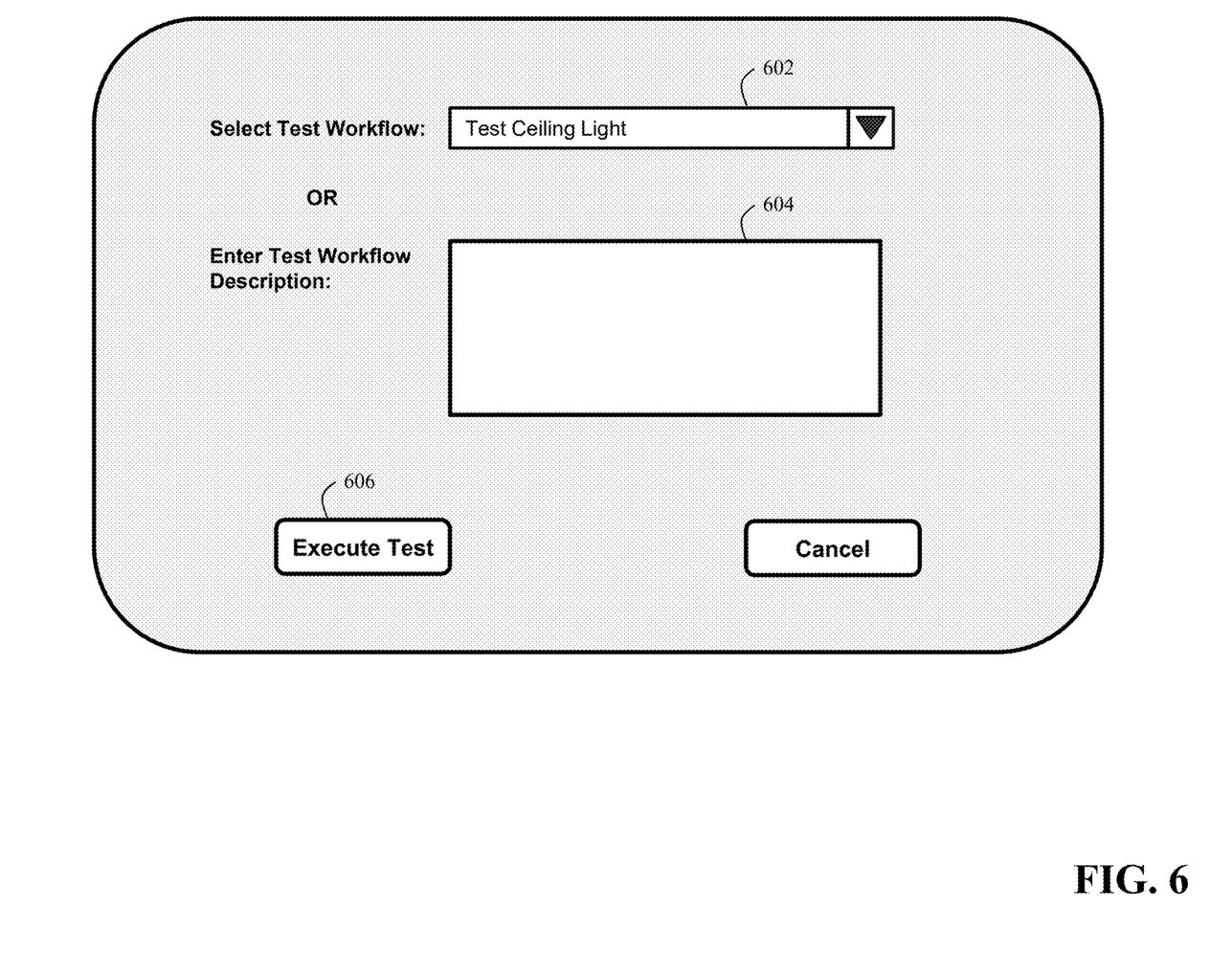
FIG. 6 is a diagram of an exemplary user interface screen for selecting a test workflow to be executed by a robotic device.

FIG. 6 is a diagram of an exemplary user interface screen 600 for selecting a test workflow to be executed by robotic device 102. As shown in FIG. 6, the user interface 600 includes a drop-down menu 602 where the user of client computing device 116 can select from a menu of available test workflows. In this example, the user has selected the "Test Ceiling Light" workflow. The user interface 600 also includes a text entry field 604 where the user can type in a test workflow description to be executed by the robotic device 102. In some embodiments, the user can provide instructions in the form of a prompt that can be parsed and provided by test agent module 110b as input to LLM(s) 112 for the generation of a sequence of actions. An example of user input instructions are provided below:

"Context: The background is virtual reality application testing. It is necessary to break down the tester's documentation into actions that can be executed by robots. For instance, the test document describes checking if a door can be opened, with the expected result being that the door opens when the button is pressed. The tasks executable by a robot to check if a door can be opened are:
    1. Locate the door.
    2. Move to the door.
    3. Find the door handle.
    4. Reach out with the hand to touch the door handle.
    5. Confirm the state of the door being open.
Instruction: Create a test case for the robot to test if a ceiling light is working."

As shown above, the user input instructions include an example for, e.g., a different test case that provides context to the LLM for generating the desired test workflow (including a set of decomposed tasks executable by the robot) and a direct instruction to the LLM which includes a short description of the test workflow to be generated by the LLM. The user can then select the Execute Test button 606 to proceed.

Turning back to FIG. 5, test agent module 110b receives the selected test workflow and/or user input from client computing device 116. In the case where the user selected an existing test workflow from drop down menu 602, test agent module 110b can retrieve a corresponding test workflow description from, e.g., database 116. In the case where the user entered an instruction prompt in field 604, task manager 202 of test agent module 110b provides the user input to LLM(s) 112 which converts the instruction prompt into a set of decomposable tasks executable by the robot to accomplish the desired test (i.e., "Create a test case for the robot to test if a ceiling light is working"). Continuing with the example provided above, task manager 202 provides the user input to LLM(s) 112, which analyze the input prompt and provide corresponding output in the form of a task workflow description comprising a set of tasks executable by the robot 102 to test if the ceiling light is working. An example of the output task workflow description generated by LLM(s) 112 is provided below:

"Here are the decomposed tasks executable by a robot to test if a ceiling light is working:
1. Locate the light.
2. Locate the light switch that corresponds to the light.
3. Approach the light switch.
4. Reach out with a hand or manipulator to flip the light switch.
5. Observe the light to identify any change in state.
6. Confirm if the ceiling light turns on when the light switch is activated."

Action manager 204 of test agent module 110b receives the output task workflow description from LLM(s) 112 and converts (step 502) the task workflow description into a sequence of actions in a format interpretable by robotic device 102. As mentioned previously, the robotic device 102 is pre-trained to perform a discrete set of operations using imitation learning. In some embodiments, action manager 204 is configured to map each of the tasks set forth in the task workflow description to one or more operations that robotic device 102 has been trained to carry out. For example, action manager 204 may identify the task "1. Locate the light" from the task workflow description and determine that the robot 102 should perform the following actions to locate the light: a) activate controller(s) 104a/actuator(s) 104b to move head in one or more directions; b) activate screen capture module 105b of VR device 104e to capture a screenshot of the virtual environment generated by app under test 105a; and c) analyze captured screenshot to determine whether the light appears as an object in the virtual environment. It should be appreciated that each of these operations can be further decomposed into atomic actions to be executed in sequence in order for the robot 102 to successfully complete the operation. For example, the operation to 'move head in one or more directions' may be decomposed into atomic actions, e.g., move head to the right for 1.5 seconds at a slow speed; rotate head up to an angle of 30 degrees; etc. that can be carried out by robot 102.

Action manager 204 of test agent module 110b transmits (step 504) the sequence of actions to the robotic device 102 for execution. In some embodiments, communication module 110a receives the sequence of actions from action manager 204 and transmits the sequence of actions via network 106 to communication module 103a of robotic device 102 using the corresponding APIs 302a-302d for activation of the desired component(s) 104a-104e. For example, the first action in the sequence of actions may be to move the robot's head to the right for 1.5 seconds at a slow speed. Action manager 202 transmits this action to communication module 110a which generates a request message using the head action API. An exemplary request message generated by module 103a for the above action using the head action API is:

robot/head/move?direction=right&speed=slow&t=1.5s

As shown above, the request is in the form of a URL with attributes specifying the component ('head'), the action ('move'), and parameters specifying the manner of movement ('direction=right&speed-slow&t=1.5 s'). Communication module 110a calls the head action API using the request message, which directs the message to the corresponding API 302c in communication module 103a of robotic device 102.

Communication module 103a transmits the requested action and associated parameters to action execution module 304 of control module 103b. Action execution module 304 converts the requested action and parameters into an action signal transmitted to the identified component(s) 104a-104e of robot hardware 104 for execution. In the above example, action execution module 304 converts the request message into a signal that directs controller(s) 104a and actuator(s) 104b that controls movement of the robot head to move the head to the right for 1.5 seconds at a slow speed. Upon receiving the action signal, controller(s) 104a/actuator(s) 104b activate to physically move the head and return a response signal to action execution module 304 upon completion of the movement. Action execution module 304 transmits the response signal along with the request message to stats recording module 306.

Stats recording module 306 writes a log entry to stats log 308 with the corresponding outcome of the action execution by robot hardware 104. In some embodiments, stats recording module 306 is configured to write a plurality of log entries for a single action being executed by robot 102. Using the above example, when action execution module 304 transmits the action signal for movement of the head to robot hardware 104, stats recording module 306 writes a log entry to stats log 308 that includes the key-value pair of "{head: <moving>}." When action execution module 304 receives a response signal from robot hardware 104 that indicates the head has stopped moving (i.e., after 1.5 seconds), stats recording module 306 writes another log entry to stats log 308 that includes the key-value pair of "{head: <idle>}."

In the case where the robot hardware 104 is unable to carry out the requested action (e.g., a requested arm angle is greater than a threshold limit of the corresponding actuator 104b for the arm), the response signal from hardware 104 indicates a fault and stats recording module 306 writes a log entry to stats log 308 that includes the key-value pair of "{armLeft: <fault>}."

In this example, stats recording module 306 can transmit a response message to server computing device 108 via robot stats API 302e that includes an error indicator:
{
   status: 400,
   message: "Invalid request: the angle of joint-3 for the left-arm param surpasses the threshold limit,"
   stats: <one or more log entries from stats log 308>
}

For each action in the sequence of actions, action manager 204 of server computing device 108 receives (step 506) execution data (i.e., log entries from stats log 308) corresponding to an outcome of execution of the action by the robotic device 102. For example, if the requested action is for movement of the robot's arm, action manager 204 receives execution data from robotic device 102 via the arm action API of communication module 110a. Action manager 204 transmits the execution data to evaluator 206.

In some embodiments, evaluator 206 analyzes the execution data to determine whether the robotic device 102 successfully executed the requested action. As mentioned above, the robot may be unable to execute the action as requested and result in a fault state. Instead of proceeding with capture and evaluation of, e.g., image data and/or vector data from VR device 104e, evaluator 206 can transmit a notification to action manager 204 that execution of the action was not successful due to the fault state. Action manager 204 can determine whether to generate an error notification to, e.g., client computing device 116 for intervention by the user and/or whether to automatically modify the requested action (e.g., adjust the action parameters to conform to the threshold limit) and re-submit the action for execution by robot 102.

When a fault state is not detected, evaluator 206 captures (step 508) one or more of image data or vector data corresponding to a current state of a VR application (i.e., app under test 105a of VR device 104e). In this step, evaluator 206 instructs action manager 204 to capture one or more screenshots from app under test 105a using screen capture module 105b. As can be appreciated, at least one of the screenshots can correspond to a current state of app under test 105a at the completion of the executed action. In this context, the state of app under test 105a includes, but is not limited to, the graphical depiction of the virtual environment generated by app under test 105a and any objects represented therein, as would be viewed by a user wearing VR device 104e. Screen capture module 105b transmits the screenshot(s) to server computing device 108.

In some embodiments, evaluator 206 instructs action module 204 to capture vector data from VR device 104e corresponding to a current state of a VR application (i.e., app under test 105a of VR device 104e). The vector data can include, but is not limited to, (i) object vector data associated with one or more target objects in the virtual reality environment and (ii) device vector data associated with the virtual reality device. For example, the vector data can comprise one or more of x-coordinate data, y-coordinate data, z-coordinate data, and velocity data captured from sensor(s) of VR device 104e that relate to the current position, orientation, and/or movement of VR device 104e with respect to the virtual environment generated by app under test 105a. In another example the vector data can comprise one or more of x-coordinate data, y-coordinate data, z-coordinate data, and velocity data that relate to the absolute position of one or more virtual objects in the environment and/or the relative position of one or more of the virtual objects with respect to the VR device 104e.

Once the image data and/or vector data is captured, evaluator 206 analyzes (step 508) one or more of the image data, the vector data, and the execution data to determine whether the robotic device 102 successfully executed the action. In some embodiments, evaluator 206 can leverage the processing of LLM(s) 112 as part of the analysis step to determine whether the action was successful.

In one example (mentioned previously), evaluator 206 can use the image data in conjunction with visual analysis capabilities of LLM(s) 112 to determine whether the robot 102 successfully executed the action via the phase relationship between multiple images, or frames, captured from app under test 105a. As can be appreciated, one or more of LLM(s) 112 can be configured as a multimodal LLM, i.e., capable of receiving as input both images and text instructions, and analyzing the images based upon the text instructions to produce an output. In this approach, the image data comprises real-time visual data of target objects in the virtual environment as well as the VR device within the virtual environment. Evaluator 206 uses the current task/action in the workflow to identify, e.g., names and positions of target objects involved. By recognizing these objects, evaluator 206 can determine the phase relationship between the robot 102 and the target objects across multiple frames.

An example input prompt to LLM(s) 112 for determining phase relationship is:
Context: "The current task is to approach the red button until it turns green. The images contain multiple frames of the scene, including the objects 'button_red' and 'VR device'."
Instruction: "You are a software tester. I will provide you with the task and visual data. Your task is to analyze the objects involved in the task, identify the relevant objects from the visual data, determine the phase relationship between the target object and the VR device object across multiple frames, and finally return the result in JSON format."

LLM 112 executes to generate a corresponding reply, such as a key-value pair: {"phase_relationship": <calculated_phase_difference>}. Based upon the value of the phase difference, evaluator 206 can determine whether the robot 102 successfully completed the action(s) called out in the workflow step being executed. For example, evaluator 206 may expect the phase difference to be within a defined threshold or tolerance after successful completion of the action. When the phase difference satisfies the expectation of the evaluator 206, the action is considered successfully executed. When the phase difference falls outside the expected threshold/tolerance, evaluator 206 can determine that the action was not successfully executed.

Another exemplary technique that can be used by evaluator 206 to determine whether the robotic device 102 successfully executed the action is obtaining a vector difference between the VR device 104e and the target object in the virtual environment using, e.g., the vector data obtained from VR device 104e. In an example, evaluator 206 can use the image data and vector data, in conjunction with visual analysis capabilities of LLM(s) 112, to determine whether the robot 102 successfully executed the action via a vector difference between the VR device 104e and the target object(s). In this approach, the image data comprises real-time visual data of target objects in the virtual environment as well as the VR device within the virtual environment and the vector data comprises (i) object vector data associated with one or more target objects in the virtual reality environment and (ii) device vector data associated with the virtual reality device.

For example, the current task is to approach a red button until it turns green. Evaluator 206 receives vector data for multiple objects in the virtual environment as well as the VR device 104e. In the vector list, there are several objects including a "button_red" and "VR device." An example input prompt to LLM(s) 112 for determining vector difference in this example is:
Instructions: "You are a software tester. I will provide you with the task and a vector list. Your task is to analyze the objects involved in the task, find the vector of the relevant objects from the vector list, calculate the vector difference between the target object and the VR device, and finally return the result in JSON format."
Input: "The task is to approach the red button until it turns green, and the vector list is {'VR_device': 'x,y,z', 'button_red': 'a,b,c', ... }

LLM 112 executes to generate a corresponding reply, such as a key-value pair: {"vector_difference": <a-x, b-y, c-z>}. Based upon the vector differences (either individual or aggregate), evaluator 206 can determine whether the robot 102 successfully completed the action(s) called out in the workflow step being executed. For example, evaluator 206 may expect the vector difference(s) to be within a defined threshold or tolerance after successful completion of the action. When the vector difference(s) satisfy the expectation of the evaluator 206, the action is considered successfully executed. When the vector difference(s) fall outside the expected threshold/tolerance, evaluator 206 can determine that the action was not successfully executed.

Upon determining that the robotic device 102 successfully executed the action, evaluator 206 informs action manager 204 of the determination. Action manager 204 repeats the steps of receiving execution data (step 506), capturing one or more of image data or vector data corresponding to a current state of app under test 105a (step 508), and analyzing one or more of the image data, the vector data, and/or the execution data to determine whether the robotic device successfully executed the action (step 510).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account-allowing access to the computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN)), a private IP network, an IP private branch exchange (IPBX), a wireless network (e.g., radio access network (RAN), Bluetooth™ near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automated testing of virtual reality software applications using robotic devices, the system comprising:
   a server computing device;
   a robotic device in communication with the server computing device; and
   a virtual reality device in communication with the server computing device and executing a virtual reality software application to generate and display a virtual reality environment;
   wherein the server computing device:
      converts a test workflow description into a sequence of actions in a format interpretable by the robotic device;
      transmits the sequence of actions to the robotic device for execution;
      for each action in the sequence of actions:
         a) receives, from the robotic device, execution data corresponding to an outcome of execution of the action by the robotic device;
         b) captures, from the virtual reality device, image data and vector data corresponding to a current state of the virtual reality software application, wherein the image data comprises a screen capture of the virtual reality software application and the vector data comprises (i) object vector data associated with one or more target objects in the virtual reality environment and (ii) device vector data associated with the virtual reality device; and
         c) analyzes one or more of the image data, the vector data, and the execution data to determine whether the robotic device successfully executed the action; and
         d) upon determining that the robotic device successfully executed the action, repeats steps a)-d) for the next action in the sequence of actions.

2. The system of claim 1, wherein converting the test workflow description into the sequence of actions comprises:
   providing the test workflow description and an instruction prompt as input to a large language model; and
   generating, using the large language model, the sequence of actions by converting the test workflow description into a plurality of tasks based upon the instruction prompt, and mapping each of the plurality of tasks to an action performable by the robotic device.

3. The system of claim 1, wherein the execution data comprises one or more status indicators each corresponding to a physical feature of the robotic device.

4. The system of claim 3, wherein each status indicator is associated with a timestamp of execution of the action by the robotic device.

5. The system of claim 3, wherein the physical features of the robotic device include one or more of: a left arm, a right arm, a head, a movement mechanism, and a physical environment sensor.

6. The system of claim 1, wherein analyzing one or more of the image data, the vector data, and the execution data to determine whether the robotic device successfully executed the action comprises:
   identifying a fault state of the robotic device using the execution data; and
   determining that the robotic device did not successfully execute the action based upon the fault state.

7. The system of claim 1, wherein analyzing one or more of the image data, the vector data, and the execution data to determine whether the robotic device successfully executed the action comprises:
   comparing the object vector data to the device vector data to determine a difference between the object vector data to the device vector data; and determining that the robotic device successfully executed the action based upon the difference between the object vector data and the device vector data.

8. The system of claim 1, wherein analyzing one or more of the image data, the vector data, and the execution data to determine whether the robotic device successfully executed the action comprises:
providing the image data and an expected result of the action as input to a large language model; and
determining, using the large language model, whether the robotic device successfully executed the action by comparing one or more aspects of the image data to the expected result of the action.

9. The system of claim 1, wherein analyzing one or more of the image data, the vector data, and the execution data to determine whether the robotic device successfully executed the action comprises:
providing a plurality of images from the image data as input to a large language model;
calculating, using the large language model, a phase difference between one or more objects depicted in the image data across the plurality of images; and
determining whether the robotic device successfully executed the action based upon the phase difference.

10. The system of claim 1, wherein when executing the action, the robotic device:
captures physical environment data from one or more sensors coupled to the robotic device;
determines one or more obstacles based upon the physical environment data; and
modifies the action based upon the determined obstacles.

11. The system of claim 1, wherein the server computing device further generates a new action for insertion into the sequence of actions based upon the image data and transmits the new action to the robotic device for execution.

12. The system of claim 1, wherein the vector data comprises one or more of x-coordinate data, y-coordinate data, z-coordinate data, and velocity data.

13. A computerized method of automated testing of virtual reality software applications using robotic devices, the method comprising:
converting, by a server computing device, a test workflow description into a sequence of actions in a format interpretable by a robotic device in communication with the server computing device;
transmitting, by the server computing device, the sequence of actions to the robotic device for execution;
for each action in the sequence of actions:
a) receiving, by the server computing device from the robotic device, execution data corresponding to an outcome of execution of the action by the robotic device;
b) capturing, by the server computing device from a virtual reality device in communication with the server computing device, image data and vector data corresponding to a current state of a virtual reality software application executed by the virtual reality device to generate and display a virtual reality environment, wherein the image data comprises a screen capture of the virtual reality software application and the vector data comprises (i) object vector data associated with one or more target objects in the virtual reality environment and (ii) device vector data associated with the virtual reality device;
c) analyzing, by the server computing device, one or more of the image data, the vector data, and the execution data to determine whether the robotic device successfully executed the action; and
d) upon determining that the robotic device successfully executed the action, repeating, by the server computing device, steps a)-d) for the next action in the sequence of actions.

14. The method of claim 13, wherein converting the test workflow description into the sequence of actions comprises:
providing the test workflow description and an instruction prompt as input to a large language model; and
generating, using the large language model, the sequence of actions by converting the test workflow description into a plurality of tasks based upon the instruction prompt, and mapping each of the plurality of tasks to an action performable by the robotic device.

15. The method of claim 13, wherein the execution data comprises one or more status indicators each corresponding to a physical feature of the robotic device.

16. The method of claim 15, wherein each status indicator is associated with a timestamp of execution of the action by the robotic device.

17. The method of claim 15 wherein the physical features of the robotic device include one or more of: a left arm, a right arm, a head, a movement mechanism, and a physical environment sensor.

18. The method of claim 13, wherein analyzing one or more of the image data, the vector data, and the execution data to determine whether the robotic device successfully executed the action comprises:
identifying a fault state of the robotic device using the execution data; and
determining that the robotic device did not successfully execute the action based upon the fault state.

19. The method of claim 13, wherein analyzing one or more of the image data, the vector data, and the execution data to determine whether the robotic device successfully executed the action comprises:
comparing the object vector data to the device vector data to determine a difference between the object vector data to the device vector data; and
determining that the robotic device successfully executed the action based upon the difference between the object vector data and the device vector data.

20. The method of claim 13, wherein analyzing one or more of the image data, the vector data, and the execution data to determine whether the robotic device successfully executed the action comprises:
providing a plurality of images from the image data as input to a large language model;
calculating, using the large language model, a phase difference between one or more objects depicted in the image data across the plurality of images; and
determining whether the robotic device successfully executed the action based upon the phase difference.

21. The method of claim 13, wherein analyzing one or more of the image data, the vector data, and the execution data to determine whether the robotic device successfully executed the action comprises:
providing the image data and an expected result of the action as input to a large language model; and
determining, using the large language model, whether the robotic device successfully executed the action by comparing one or more aspects of the image data to the expected result of the action.

22. The method of claim 13, wherein, when executing the action, the method further comprising:
   capturing, by the robotic device, physical environment data from one or more sensors coupled to the robotic device;
   determining, by the robotic device, one or more obstacles based upon the physical environment data; and
   modifying by the robotic device, the action based upon the determined obstacles.

23. The method of claim 21, wherein the server computing device further generates a new action for insertion into the sequence of actions based upon the image data and transmits the new action to the robotic device for execution.

24. The method of claim 13, wherein the vector data comprises one or more of x-coordinate data, y-coordinate data, z-coordinate data, and velocity data.

\* \* \* \* \*